US012470725B2

(12) United States Patent
Lucas et al.

(10) Patent No.: US 12,470,725 B2
(45) Date of Patent: Nov. 11, 2025

(54) COMPRESSED CHIP TO CHIP TRANSMISSION

(71) Applicant: TEXAS INSTRUMENTS INCORPORATED, Dallas, TX (US)

(72) Inventors: Jonathan Andrew Lucas, Frisco, TX (US); Jeffrey Matthew Kempf, Dallas, TX (US); Jeffrey Scott Farris, Flower Mound, TX (US)

(73) Assignee: TEXAS INSTRUMENTS INCORPORATED, Dallas, TX (US)

( * ) Notice: Subject to any disclaimer, the term of this patent is extended or adjusted under 35 U.S.C. 154(b) by 0 days.

(21) Appl. No.: 18/342,389

(22) Filed: Jun. 27, 2023

(65) Prior Publication Data

US 2023/0421783 A1 Dec. 28, 2023

Related U.S. Application Data

(60) Provisional application No. 63/367,069, filed on Jun. 27, 2022.

(51) Int. Cl.

*H04N 19/25* (2014.01)
*H04N 19/124* (2014.01)
*H04N 23/84* (2023.01)

(52) U.S. Cl.

CPC .......... *H04N 19/25* (2014.11); *H04N 19/124* (2014.11); *H04N 23/841* (2023.01)

(58) Field of Classification Search

CPC .... H04N 19/25; H04N 19/124; H04N 23/841; H04N 1/64

See application file for complete search history.

(56) References Cited

U.S. PATENT DOCUMENTS

| | | | | |
|---|---|---|---|---|
| 7,525,552 B2 * | 4/2009 | Yang | H04N 19/96 345/593 |
| 2009/0278984 A1 * | 11/2009 | Suzuki | H04N 7/081 348/554 |
| 2010/0214577 A1 * | 8/2010 | Owen | H04N 1/603 358/1.9 |
| 2016/0283825 A1 * | 9/2016 | Akenine-Moller | H04N 1/64 |
| 2017/0142426 A1 * | 5/2017 | Kempf | H04N 1/644 |
| 2018/0176585 A1 * | 6/2018 | Kalevo | H04N 19/186 |
| 2021/0287404 A1 * | 9/2021 | Chang | H04N 19/12 |

* cited by examiner

*Primary Examiner* — Zhubing Ren

(74) *Attorney, Agent, or Firm* — Michael T. Gabrik; Frank D. Cimino

(57) ABSTRACT

In some examples, a method includes serializing, via a processor, image data for a first image to form serialized data mapped to RBG pixels of a second image, the image data in a format other than a RGB pixel format. The method also includes transmitting, by the processor, the serialized data via RGB signaling lines.

20 Claims, 7 Drawing Sheets

| 24bpp MODE | | |
|---|---|---|
| DSI | CFIM PACKET | |
| PIXEL | MSB | LSB |
| 0 | 23 | 0 |
| 1 | 47 | 24 |
| 2 | 71 | 48 |
| 3 | 95 | 72 |
| 4 | 119 | 96 |
| 5 | 143 | 120 |
| 6 | 167 | 144 |
| 7 | 191 | 168 |
| 8 | 215 | 192 |
| 9 | 239 | 216 |
| 10 | 263 | 240 |
| 11 | 287 | 264 |
| 12 | 311 | 288 |
| 13 | 335 | 312 |
| 14 | 359 | 336 |
| 15 | 383 | 360 |
| 16 | 407 | 384 |
| 17 | 431 | 408 |
| 18 | 455 | 432 |
| 19 | 474 | 456 |

| 30bpp MODE | | |
|---|---|---|
| DSI | CFIM PACKET | |
| PIXEL | MSB | LSB |
| 0 | 29 | 0 |
| 1 | 59 | 30 |
| 2 | 89 | 60 |
| 3 | 119 | 90 |
| 4 | 149 | 120 |
| 5 | 179 | 150 |
| 6 | 209 | 180 |
| 7 | 239 | 210 |
| 8 | 269 | 240 |
| 9 | 299 | 270 |
| 10 | 329 | 300 |
| 11 | 359 | 330 |
| 12 | 389 | 360 |
| 13 | 419 | 390 |
| 14 | 449 | 420 |
| 15 | 474 | 450 |

COMPRESSED CHIP TO CHIP TRANSMISSION

CROSS-REFERENCE TO RELATED APPLICATIONS

The present application claims priority to U.S. Provisional Patent Application No. 63/367,069, which was filed Jun. 27, 2022, is titled "System And Method For Power Savings Through Using Palette Compressed Format For Chip To Chip Transmission," and is hereby incorporated herein by reference in its entirety.

BACKGROUND

Display systems project images onto surfaces, such as on a screen of the display system or an external surface, to display video or still pictures. Display systems include display devices such as cathode-ray tube (CRT) displays or spatial light modulators (SLMs), such as liquid crystal displays (LCDs), liquid crystal on silicon (LCoS) devices, micro light emitting diodes (microLEDs), digital mirror device (DMD) displays, etc. A display device may include adjustable display elements, which are usually arranged in a matrix of rows and columns. The display elements form images with image location blocks, also referred to herein as pixels, on the screen or the surface where the image is projected. The display elements are adjusted by a controller to provide, based on color shades in the pixels of a displayed image, levels of brightness in the displayed image. The controller controls the display elements based on image data received from a processing circuit.

SUMMARY

In some examples, an apparatus includes a processor and transmitter circuitry. The processor is configured to compress a first image according to clustering techniques to provide a palette for a block of pixels of the first image and index values mapping pixels of the first image to the palette, and serialize the palette and the index values to form serialized data mapped to red-green-blue (RGB) pixels of a second image. The transmitter circuitry is coupled to the processor and configured to transmit the serialized data via RGB signaling lines.

In some examples, a method includes serializing, via a processor, image data for a first image to form serialized data mapped to RBG pixels of a second image, the image data in a format other than a RGB pixel format. The method also includes transmitting, by the processor, the serialized data via RGB signaling lines.

In some examples, a system includes a controller, RGB signaling lines, a display device coupled to the controller, and a processor coupled to the controller via the RGB signaling lines. The processor is configured to serialize image data for a first image to form serialized data mapped to RGB pixels of a second image, the image data in a format other than a RGB pixel format, and transmit the serialized data to the controller via the RGB signaling lines.

DETAILED DESCRIPTION

Figure 1:
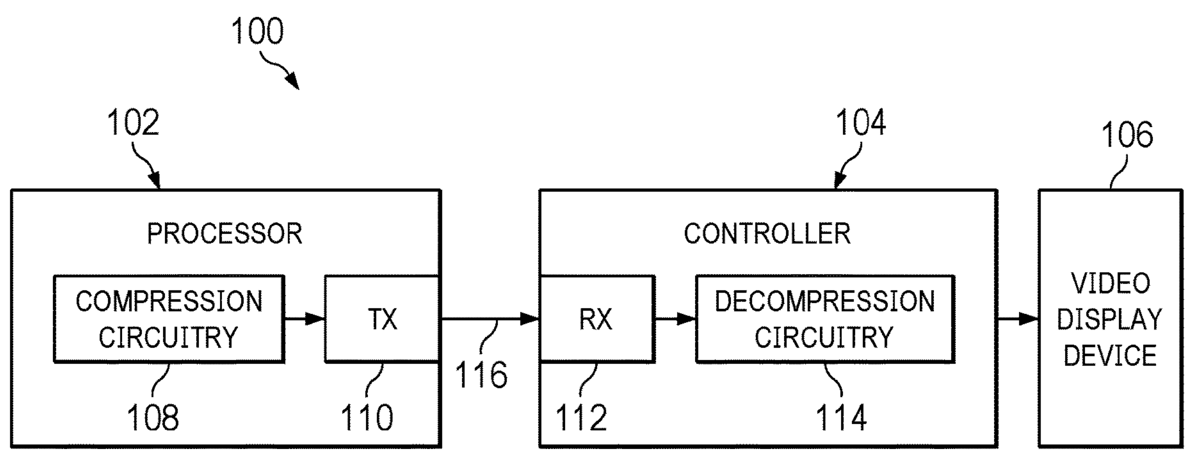
FIG. 1 is a block diagram of a system, in accordance with various examples.

In general, digital images require significant memory for storage and require significant time and bandwidth for transmission. Received digital images are often compressed to reduce storage requirements. However, receiver-side compression for storage does not mitigate the time and bandwidth requirements for transmission to the receiver. In addition, certain device, components, or circuits have a defined set of input and output terminals that are suitable for communicating particular data, such as RGB information of a digital image. In some examples, the terminals may not be suitable for communicating the compressed information. As such, additional terminals may be added to the devices, components, or circuits to accommodate communication of compressed information, increasing a cost and size of those devices, components, or circuits.

Examples of this description provide for the transmission and receipt of compressed RGB information via conventional RGB signaling lines. While compressed information is described herein, the examples of this description may also be applicable to uncompressed data for transmission and receipt via conventional RGB signaling lines. In some examples, the RGB information is compressed according to cluster compression techniques, such as described in U.S. Pat. No. 9,986,135, which is titled "Spatially Localized Cluster Compression," or U.S. Pat. No. 11,657,541, which was filed Dec. 31, 2020, and is titled "Parent-Child Cluster Compression," each of which is incorporated herein by reference in its entirety. Generally, the compression may be in a palette compression format in which a color palette is determined for a digital image and the digital image is split into multiple regions, each having a color defined by reference to one entry of the color palette. In this way, an amount of information per pixel is reduced. In other examples, the information is compressed according to any other suitable compression process. In some examples, the information is bitplane data, in a compressed or uncompressed format, that defines a binary state of mirrors in a DMD display in a time multiplexed manner. Generally, a DMD display is driven or controlled according to a pulse width modulation (PWM) scheme. The intensity of a given pixel displayed by the DMD display is given by a proportion of time that a mirror of the DMD display is angled toward projection optics of the DMD display. As such, the frame period is partitioned into a pulse train, where each pulse is referred to as a bit plane.

In an example, compressed RGB information is received. The compressed RGB information may be received from any suitable component, such as a processor or a graphics processing unit (GPU), or from a purpose-built component, such as a compression processor or cluster compression processor (CCP). In other examples, the compressed RGB information is received or obtained from a storage device or memory. In some examples, a format of the compressed RGB information includes a number of color palettes, a number of keys, and a control word. For example, for RGB information of 256 pixels, the compressed RGB information may include about 32 color palettes, each about 30 bits in size, about 256 keys, each about 3 bits in size, and a control word of about 19 bits in size. The color palettes may define RGB colors, the keys may correspond uniquely to each pixel of the RGB data and include a reference to a color of a color palette, and the control word may include instructions for interpreting the color palette(s) and key(s). Generally, for 256 pixels of RGB information, the compressed RGB information may include about 475 bits of data. The received, compressed RGB information may be represented in a single data packet which may be serialized for transmission. A RGB pixel may be represented by three sets or groupings of data corresponding to red, green, and blue color information. Each of these sets of data may be about 10 bits in length, about 8 bits in length, or any other suitable length. The compressed RGB information may be serialized into a number of RGB pixels and the RGB pixels may be transmitted sequentially over respective signaling lines of the RGB signaling lines until all RGB pixels of the serialized information have been transmitted. In this way, about 30 bits, about 24 bits, or any other length determined suitable for a communication protocol by which the serialized data is communicated, may be transmitted in a given unit of time via the RGB signaling lines. The compressed RGB information may be serialized and transmitted over multiple clock cycles until all bits of the compressed RGB information have been serialized and transmitted.

In various examples, compressing the RGB information prior to transmission may reduce a bandwidth requirement for transmitting the RGB information, reduce a time for transmitting the RGB information, and/or reduce power consumed in transmitting the RGB information. Compressing the RGB information may also reduce power consumed by a receiver of the compressed RGB information resulting from the compression having already been performed.

FIG. 1 is a block diagram of a system 100, in accordance with various examples. In an example, the system 100 includes a processor 102, a controller 104 (which may be referred to as a video display controller), and a video display device 106. In some examples, the system 100 is representative of an image display system. For example, the system 100 may be representative of at least some components present in a digital projector. In other examples, the system 100 is representative of at least some components present in a portable or wearable display system, such as augmented or virtual reality. For example, the video display device 106 may be an augmented reality display of an augmented reality system which merges the display of digital information with visibility of an environment surrounding a user of the augmented reality system. In some examples, the processor 102 is coupled to the controller 104 via a physical coupling, while in other examples the processor 102 is wirelessly or communicatively coupled to the controller 104, but does not have a direct, physical coupling. The video display device 106 may be, or include, a CRT, LCD(s), DMD(s), SLM(s), or the like.

The processor 102 includes compression circuitry 108 and transmitter circuitry 110. The controller 104 include receiver circuitry 112 and decompression circuitry 114. The transmitter circuitry 110 is coupled to the receiver circuitry 112 via a transmission medium 116. While shown as a single coupling, in some examples, the transmission medium 116 includes multiple couplings, such as respective couplings between corresponding pins or input/output terminals of the transmitter circuitry 110 and the receiver circuitry 112. In an example, the transmission medium 116 includes separated red, green, and blue data couplings between the transmitter circuitry 110 and the receiver circuitry 112. In some examples, the transmission medium 116 provides a physical coupling, such as via an optically transmissive material, an electrically conductive material, or any other suitable material for conveying information through physical coupling. In other examples, the transmission medium 116 is the air, such as in examples in which the transmitter circuitry 110 lacks a direct, physical coupling to the receiver circuitry 112 and information is communicated wirelessly between the transmitter circuitry 110 and the receiver circuitry 112. In an example, the compression circuitry 108 compresses and serializes RGB information for transmission to the controller 104. The compression may be according to any suitable compression scheme, such as those described above, the scope of which is not limited herein. The compression may result in a number of compressed bits of data. In some examples, the serialization may assign a first subset of the compressed bits to a first pixel, a second subset of the compressed bits to a second pixel, and a third subset of the compressed bits to a third pixel. In some examples, the first, second, and third subsets of compressed bits are consecutive. In some examples, each subset includes 8 bits. In other examples, each subset includes 10 bits. The serialization may assign subsets of compressed bits to the first, second, and third pixels repeatedly until all bits of the compressed data have been assigned to a pixel. In some examples, after a pixel has been assigned compressed bits, the pixel is transmitted to the controller 104. In other examples, after a pixel has been assigned compressed bits, the pixel is stored or buffered until all compressed bits have been assigned, and then all pixels are transmitted to the controller 104 sequentially. In an example, the pixels correspond to conventional communication protocols of the transmitter circuitry 110 and the receiver circuitry 112. For example, the pixels may be red, green, and blue pixels, such as may be communicated by the transmitter circuitry 110 and the receiver circuitry 112 via conventional RGB signaling lines.

In an example, the controller 104 receives the data pixels via the receiver circuitry 112 and decompresses the serialized, compressed bits via the decompression circuitry 114. The decompressing may include de-serializing the compressed bits and storing the compressed bits in a storage medium (not shown), or de-serializing the compressed bits and decompressing the compressed bits to reform the RGB information. Subsequently, the controller 104 may provide the compressed bits, or the RGB information, to the video display device 106 for display to a user.

In some examples, compression of the RGB information by the processor 102 results in reduced power consumption in transmission of the RGB information (as the compressed bits) to the controller 104, reduced time for transmission between the processor 102 and the controller 104, and a reduced bandwidth requirement between the processor 102 and the controller 104. Serializing the compressed bits prior to transmission may facilitate transmitting the compressed bits via conventional signaling lines of the processor 102 and the controller 104, enhancing interoperability of the described devices and techniques. In some examples, by consuming less bandwidth and time in transmitting data from the processor 102 to the controller 104, an amount of time that the TX 110 and RX 112 may be in a sleep or idle mode, as compared to an active mode in which transmission and reception is occurring, may increase. The TX 110 and RX 112 may consume less power while in the sleep or idle mode as compared to the active mode, thus realizing the reduction in power described above.

Figure 2:
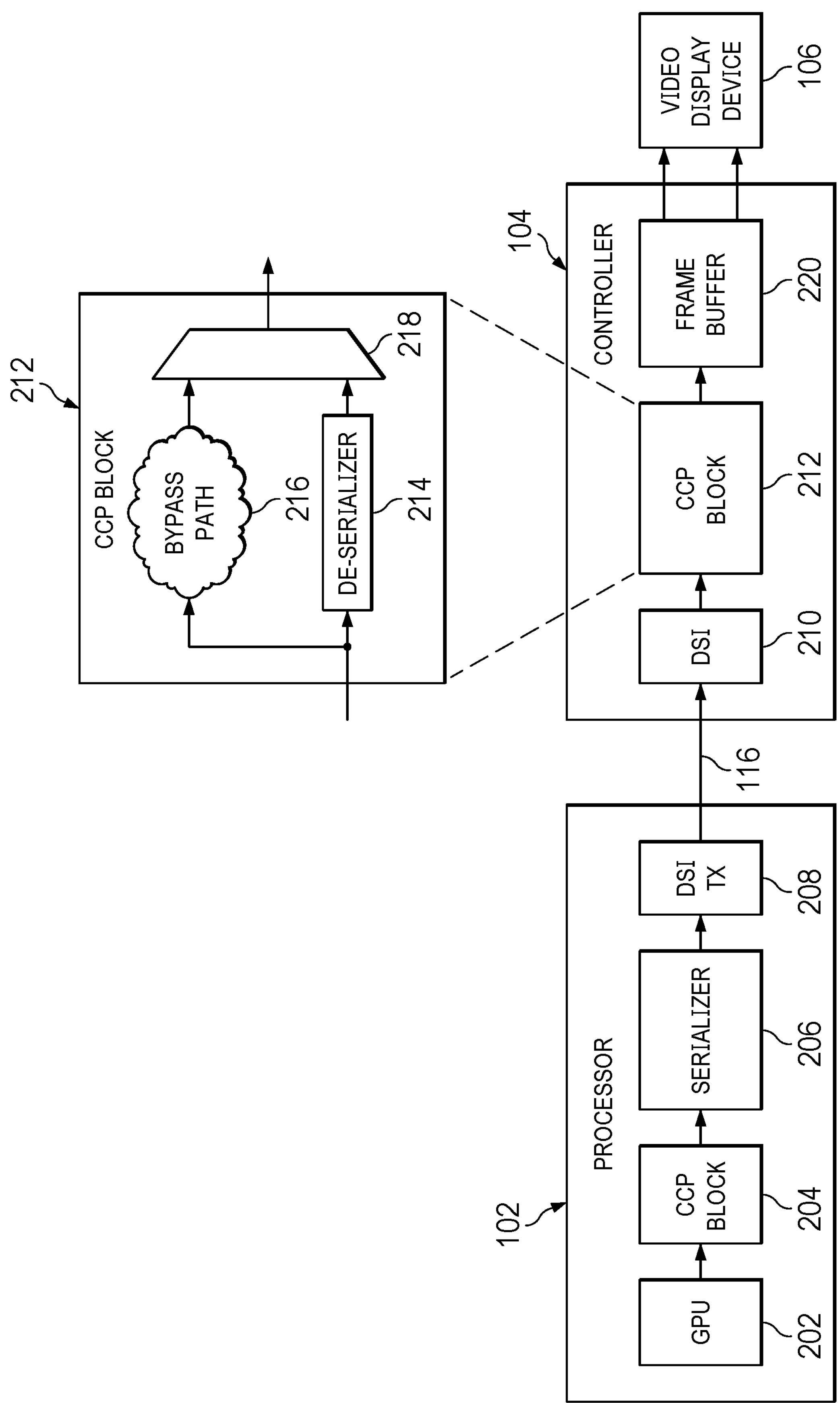
FIG. 2 is a block diagram of a processor and a controller, in accordance with various examples.

FIG. 2 is a block diagram illustrating details of the processor 102 and the controller 104, in accordance with various examples. In an example, the processor 102 includes a graphics processing unit (GPU) 202, a cluster compression processor (CCP) 204, a serializer 206, and a digital signal interface (DSI) transmitter (TX) 208. In an example, the controller 104 includes a DSI receiver (RX) 210, a CCP 212 including a de-serializer 214, a bypass path 216, and a multiplexer 218, and the controller 104 also includes a frame buffer 220. In various other examples, the controller 104 may include more, or fewer, sub-circuits, blocks, or components, the scope of which is not limited herein.

The GPU 202 provides RGB information to the CCP 204. The RGB information may be generated in whole or in part by the GPU 202, or may be received in whole or in part by the GPU 202 from another component (not shown). The CCP 204 compresses the RGB information according to any suitable compression technique, such as cluster compression, as described above herein, to provide compressed bits. The serializer 206 receives the compressed bits and serializes the compressed bits into multiple color pixels. For example, the serializer 206 places a first X bits of the compressed bits into a red pixel, a second, and immediately consecutive to the first, X bits of the compressed bits into a blue pixel, and a third and immediately consecutive to the second, X bits of the compressed bits into a green pixel, where X is any suitable value. In some examples X is 8. In other examples, X is 10. In an example, after the compressed bits have been placed into a set of RGB pixels, the serializer provides the pixels to the DSI TX 208 for transmission to the controller 104. The serializer 206 may repeat the above serialization process until all bits of the compressed bits have been serialized and transmitted. The serializer 206 may have any suitable architecture for serializing data, the scope of which is not limited herein. In an example, the DSI TX 208 transmits the pixels over conventional RGB signaling lines such that the transmission may be interoperable with existing DSI TX 208 and DSI RX 210 architectures.

The controller 104 receives the pixels at the DSI RX 210 and provides the pixels to the CCP 212. The CCP 212 provides the pixels to the bypass path 216 and the de-serializer 214 in parallel. In some examples, the bypass path 216 includes any suitable components and performs any suitable processing, the scope of which is not limited herein, other than de-serializing. For example, the bypass path 216 includes components and performs processing suitable for pixels that do not include compressed bits, as described herein. In an example, the de-serializer 214 de-serializes the pixels to form the compressed bits. For example, the X bits of a first red pixel form the first X bits of the compressed bits, the X bits of a first blue pixel form the next X bits of the compressed bits, the X bits of a first green pixel form the next X bits of the compressed bits, the X bits of a second red pixel form the next X bits of the compressed bits, and so on until the compressed bits have been reconstructed. The multiplexer 218 provides data from the bypass path 216 or the de-serializer 214 to the frame buffer 220 based on a select or control signal (not pictured), which may be received from any suitable source, the scope of which is not limited herein. Although not shown in FIG. 2, in some examples, there may be data validation or verification circuitry or operations performed to verify that each pixel of serialized, compressed bits has been received, and has been received uncorrupted. In some examples, this includes a cyclic redundancy check (CRC). In various examples, the de-serialized, compressed bits may be stored by the controller 104, may be uncompressed, or may be transmitted to another device, the scope of which is not limited herein. The frame buffer 220 receives the compressed bits from the CCP 212, decompresses the compressed bits (or receives decompressed bits from another component (not shown) that receives the compressed bits from the CCP 212 and performs the decompression), and provides data to the video display device 106. Thus, the frame buffer 220 may drive the video display device 106 to display an image based on the received data. In some examples, a driver or other interface (not shown) may receive data from the frame buffer 220 and drive the video display device 106 to display the image.

Figure 3:
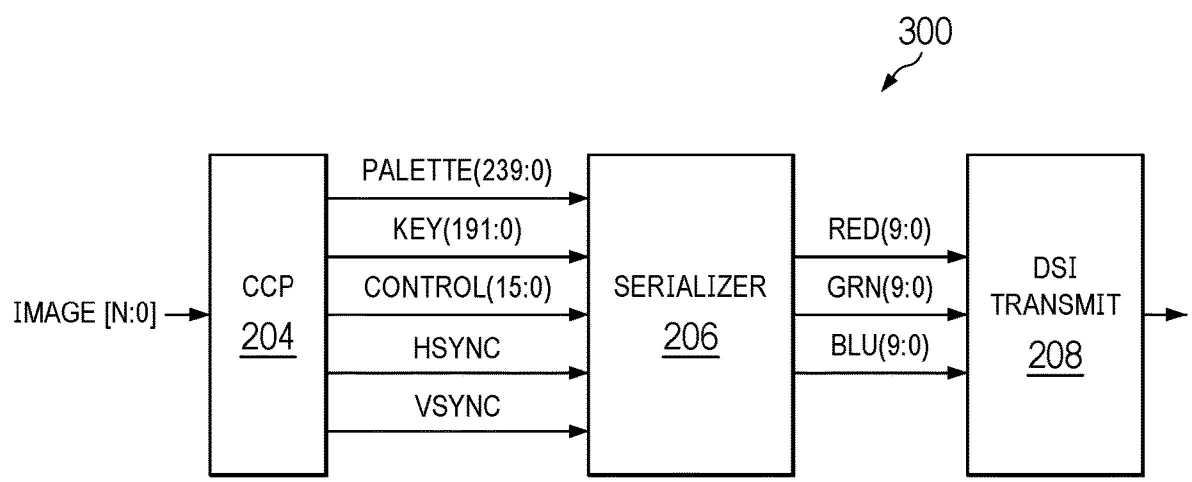
FIG. 3 is a flow diagram of communication in a processor, in accordance with various examples.

FIG. 3 is a flow diagram 300 of communication in the processor 102, in accordance with various examples. The flow diagram 300 shows at least some communication of the CCP 204, the serializer 206, and the DSI TX 208. Signals are shown in the flow diagram for an example compression implementation, such as a palette compression format, as described above herein. However, more, fewer, or different signals may be provided in the processor 102 among or between the shown components, such as resulting from the use of other compression formats, the existence of other data types, etc. Similarly, pixels are shown in the flow diagram 300 having particular sizes (e.g., expressed as [X:0], where the number of included bits is equal to X+1). In various implementations, the pixels may have any other suitable sizes, such as determined based on an amount of data to be conveyed via the pixels.

As shown in the flow diagram 300, the CCP 204 receives uncompressed image data (image) having a size of N+1 bits, represented as [N:0]. The CCP 204 compresses the image data according to any suitable process, the scope of which is not limited herein. In some examples, such as corresponding to the data shown in the flow diagram 300, the CCP 204 compresses the image data according to a palette compression format. In an example, the compression provides a palette having 240 bits, a key having 192 bits, a control word having 16 bits, and first and second synchronization bits (HSYNC and VSYNC). The palette includes a listing of RGB colors included in the image data. The key include a location of a pixel in the image data and a reference to a color of the palette corresponding to that pixel location. The control word includes instructions for decompressing the compressed bits, such as how many compressed bits are encoded per RGB pixel. In some examples, the synchronization bits are, or are based on, horizontal and vertical synchronization information, such as HSYNC and VSYNC.

The serializer 206 receives the compressed bits from the CCP 204 and serializes the compressed bits into RGB pixels. For example, the serializer 206 places a first number of the compressed bits into a red pixel red[9:0], a second number of the compressed bits into a green pixel green[9:0], and a third number of the compressed bits into a blue pixel blue[9:0]. In various examples, the order of red, green, and blue may be altered. The first, second and third number may be any value according to a communication protocol of the DSI TX 208. In some examples, the first, second and third numbers are 8. In other examples, as shown in the flow diagram 300, the first, second and third numbers are 10. The serializer 206 repeats this process of placing the next sequential compressed bits into the RGB pixels for each clock cycle of operation of the serializer 206 until all of the compressed bits have been serialized into RGB pixels.

The serializer 206 provides each of the RGB pixels to the DSI TX 208 for transmission. In some examples, the DSI TX 208 transmits or otherwise provides the RGB pixels via multiple signaling lines, such as respective red, green, and blue signaling lines. In other examples, the DSI TX 208 provides the RGB pixels serially via a single signaling line. In an example, the DSI TX 208 transmits the RGB pixels containing the compressed bits in a same manner as the DSI TX 208 would transmit uncompressed RGB information for a pixel for display via a display device.

Figure 4:
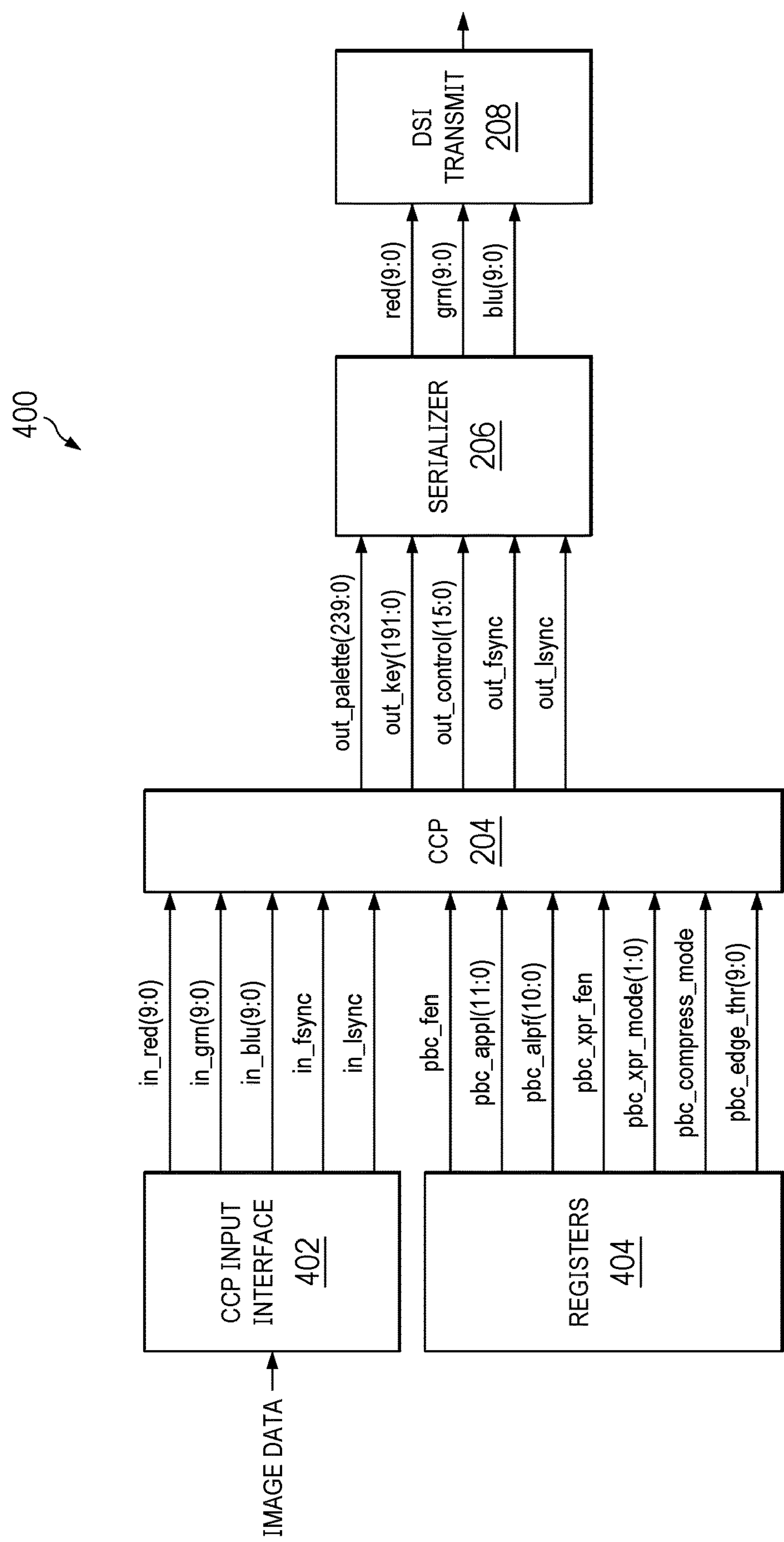
FIG. 4 is a flow diagram of communication in a processor, in accordance with various examples.

FIG. 4 is a flow diagram 400 of communication in the processor 102, in accordance with various examples. The flow diagram 400 shows at least some communication of the CCP 204, the serializer 206, and the DSI TX 208. Signals are shown in the flow diagram for an example compression implementation, such as a palette compression format, as described above herein. However, more, fewer, or different signals may be provided in the processor 102 among or between the shown components, such as resulting from the use of other compression formats, the existence of other data types, etc. Similarly, pixels are shown in the flow diagram 400 having particular sizes (e.g., expressed as [X:0], where the number of included bits is equal to X+1). In various implementations, the pixels may have any other suitable sizes, such as determined based on an amount of data to be conveyed via the pixels.

As shown in the flow diagram 400, a CCP input interface (I/F) 402 receives image data and provides the image data to the CCP 204 in the form of data packets in_red, in_grn, and in_blu, each having a size of [9:0], and synchronization signals in_fsync and in_lsync. The CCP 204 receives the image data in an uncompressed format. The CCP 204 also receives various control signals from registers 404, such as a function enable signal (pbc_fen), a signal indicating horizontal resolution (pbc_appl), a signal indicating vertical resolution (pbc_alpf), an XPR function enable signal (pbc_xpr_fen), a compression mode signal (pbc_compress_mode) indicating a type of compression, and an edge threshold signal (pbc_edge_thr) for use in performing palette compression. Based on the received image data and control signals, the CCP 204 compresses the image data according to any suitable process, the scope of which is not limited herein. In some examples, such as corresponding to the data shown in the flow diagram 400, the CCP 204 compresses the image data according to a palette compression format. In an example, the compression provides a palette (out_palette) having 240 bits, a key (out_key) having 192 bits, a control word (out_control) having 16 bits, and first and second synchronization bits (out_fsync and out_lsync). The palette includes a listing of RGB colors included in the image data. The key include a location of a pixel in the image data and a reference to a color of the palette corresponding to that pixel location. The control word includes instructions for decompressing the compressed bits, such as how many compressed bits are encoded per RGB pixel. In some examples, the synchronization bits are, or are based on, horizontal and vertical synchronization information, such as HSYNC and VSYNC.

The serializer 206 receives the compressed bits from the CCP 204 and serializes the compressed bits into RGB pixels. For example, the serializer 206 places a first number of the compressed bits into a red pixel red[9:0], a second number of the compressed bits into a green pixel green[9:0], and a third number of the compressed bits into a blue pixel blue[9:0]. In various examples, the order of red, green, and blue may be altered. The first, second and third number may be any value according to a communication protocol of the DSI TX 208. In some examples, the first, second and third numbers are 8. In other examples, as shown in the flow diagram 300, the first, second and third numbers are 10. The serializer 206 repeats this process of placing the next sequential compressed bits into the RGB pixels for each clock cycle of operation of the serializer 206 until all of the compressed bits have been serialized into RGB pixels.

The serializer 206 provides each of the RGB pixels to the DSI TX 208 for transmission. In some examples, the DSI TX 208 transmits or otherwise provides the RGB pixels via multiple signaling lines, such as respective red, green, and blue signaling lines. In other examples, the DSI TX 208 provides the RGB pixels serially via a single signaling line. In an example, the DSI TX 208 transmits the RGB pixels containing the compressed bits in a same manner as the DSI TX 208 would transmit uncompressed RGB information for a pixel for display via a display device. As such, sequential portions of the compressed image data, formatted as RGB pixels, are transmitted until all of the compressed image data has been transmitted.

Figure 5:
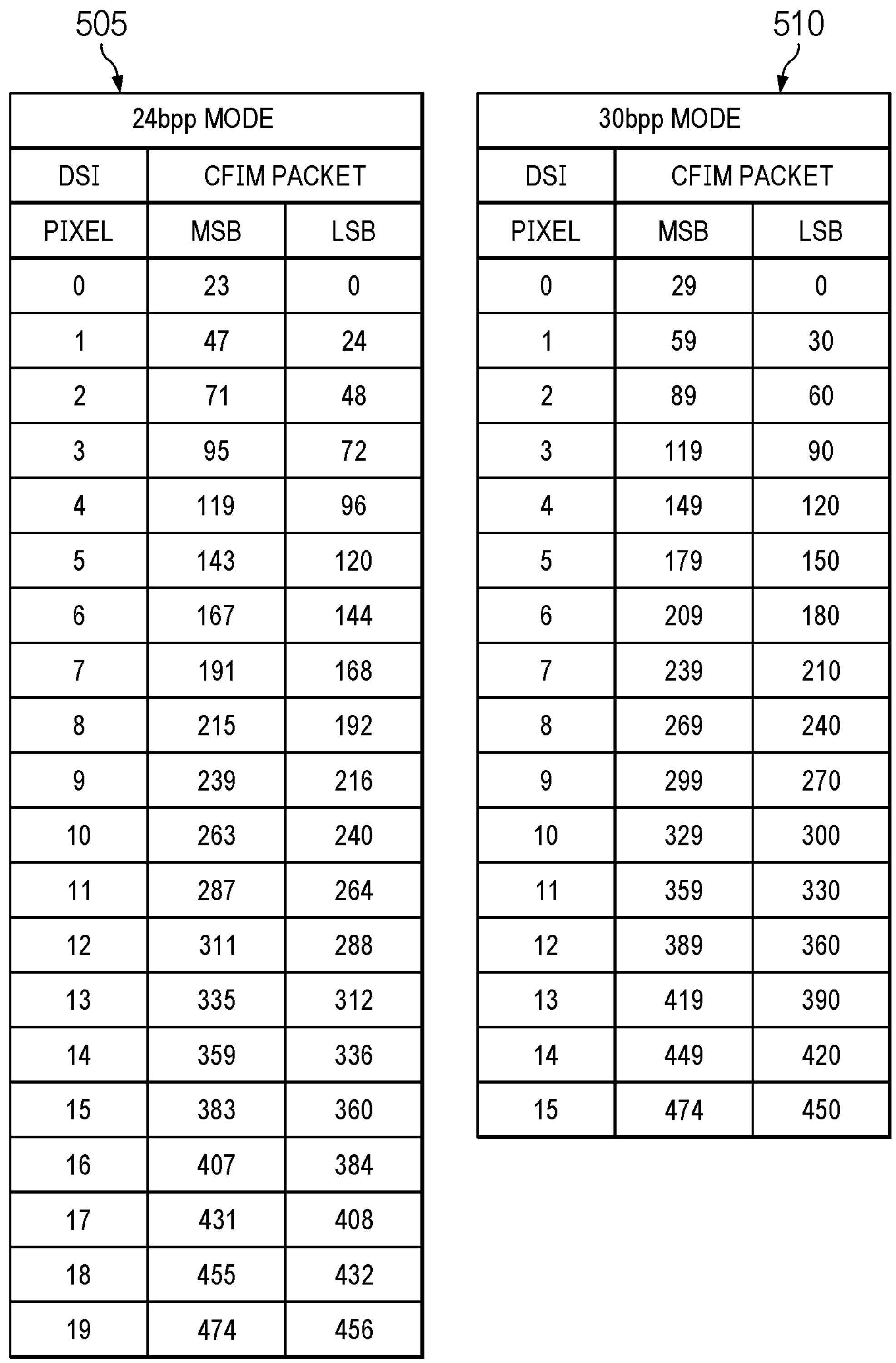
FIG. 5 includes tables of data serialization, in accordance with various examples.

FIG. 5 includes tables 505 and 510 of data serialization, in accordance with various examples. In an example, the table 505 shows mapping between pixels for transmission by the DSI TX 208 and the compressed bits received by the serializer 206 for RGB data pixels having a size of [7:0]. In an example, the table 510 shows mapping between pixels for transmission by the DSI TX 208 and the compressed bits received by the serializer 206 for RGB data pixels having a size of [9:0]. For the example of FIG. 5, the compressed bits include 475 bits of data.

As shown by the table 505, in a 24 bits per pixel (bpp) mode in which each RGB pixel includes 8 bits, in a first clock cycle the serializer 206 provides RGB data for a first pixel to the DSI TX 208 including data of bits [23:0] of the compressed bits. In a second clock cycle, the serializer 206 provides RGB data for a second pixel to the DSI TX 208 including data of bits [47:24] of the compressed bits. The serializer 206 continues in this manner for each subsequent clock cycle until RGB data is provided to the DSI TX 208 for a nineteenth pixel including data of bits [474:456] of the compressed bits. In an example, each $Y^{th}$ RGB pixel (e.g., dsi_red_pixel, dsi_green_pixel, and dsi_blue_pixel) is mapped according to the below in the 24 bpp mode, in which Y is in a range of [0:19] and CFIM is the compressed bits:

$$dsi\_red\_pixel\_Y[7:0]=CFIM[8(3Y-1)-1:8(Y+2)]$$

$$dsi\_green\_pixel\_Y[7:0]=CFIM[8(2Y-1)-1:8(Y+1)]$$

$$dsi\_blue\_pixel\_Y[7:0]=CFIM[8(Y-1)-1:8Y]$$

Also as shown by the table 510, in a 30 bpp mode in which each RGB pixel includes 10 bits, in a first clock cycle the serializer 206 provides RGB data for a first pixel to the DSI TX 208 including data of bits [29:0] of the compressed bits. In a second clock cycle, the serializer 206 provides RGB data for a second pixel to the DSI TX 208 including data of bits [59:30] of the compressed bits. The serializer 206 continues in this manner for each subsequent clock cycle until RGB data is provided to the DSI TX 208 for a nineteenth pixel including data of bits [474:450] of the compressed bits. In an example, each $Y^{th}$ RGB pixel (e.g., dsi_red_pixel, dsi_green_pixel, and dsi_blue_pixel) is mapped according to the below in the 30 bpp mode, in which Y is in a range of [0:15] and CFIM is the compressed bits:

$$dsi\_red\_pixel\_Y[9:0]=CFIM[10(3Y-1)-1:10(Y+2)]$$

$$dsi\_green\_pixel\_Y[9:0]=CFIM[10(2Y-1)-1:10(Y+1)]$$

$$dsi\_blue\_pixel\_Y[9:0]=CFIM[10(Y-1)-1:10Y]$$

In this way, the DSI TX 208 receives data in an RGB pixel format via the RGB pixel and is operable to transmit the RGB pixel containing the compressed bits via conventional RGB signaling. Based on a content of the RGB pixel (e.g., such as the control word, described above), a receiving device, such as the controller 104, can reconstruct the 475 bit packet of compressed bits from the RGB pixels. In this way, the transmission of compressed data may be facilitated via legacy or conventional systems that include RGB singling lines without necessitating dedicated or additional signaling lines to accommodate transmission of the compressed bits.

Figure 6:
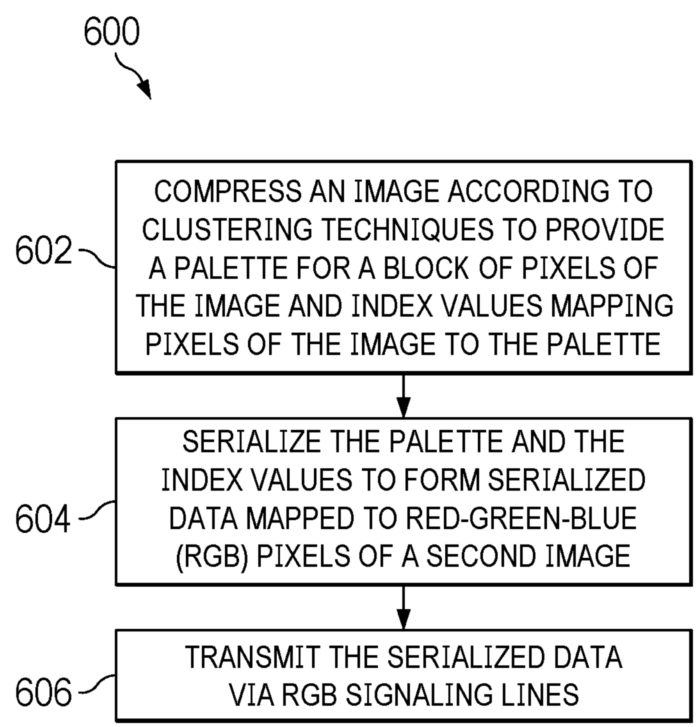
FIG. 6 is a flow diagram of a method of data transmission, in accordance with various examples.

FIG. 6 is a flow diagram of a method 600 of data transmission, in accordance with various examples. In some examples, the method 600 is implemented to serialize data into an RGB pixel format via RGB pixels. The data may be image data not in an RGB pixel format, compressed image data not in an RGB pixel format, or non-image data. In some examples, the method 600 is implemented at least in part by the processor 102, such as to transmit the RGB pixels to the controller 104 via RGB signaling lines. In some examples, the method 600 is implemented as computer-executable instructions stored on a non-transitory computer readable medium. The computer-executable instructions are executable by a processor or processing circuit, such as the processor 102, to cause the processor to be configured to carry out the operations of the method 600.

At operation 602, the processor compresses an image according to clustering techniques to provide a palette for a block of pixels of the image and index values mapping pixels of the image to the palette. Although described herein as a palette compression according to clustering techniques, in various examples, other compression processes may be used.

At operation 604, the processor serializes the palette and the index values to form serialized data mapped to RGB pixels of a second image. For example, the palette and index values, as well as other data such as a control word, synchronization data, or the like, may be represented as a data packet. The bits of the data packet may be sequentially mapped to, or placed in, RGB pixels such that an image of RGB pixels includes the data of the data packet, in a RGB pixel data format. An example of such a mapping is provided above and described with respect to FIG. 5. The first image and the second image are not visually the same. For example, the first image and the second image, if displayed by a display device, would have visually dissimilar appearances resulting from the data packet that is mapped to the RGB pixels not having been in an RGB pixel format.

At operation 606, the processor transmits the serialized data via RGB signaling lines. In some examples, the processor transmits the serialized data to a controller, such as for storage by the controller or to cause the controller to display the image via a display device. In an example, the processor transmits the serialized data by sequentially transmitting RGB pixels of the second image (e.g., portions of the serialized data) via the RGB signaling lines. The sequential transmission continues until the processor has transmitted all data of the serialized data.

Although not shown in FIG. 6, in some examples, the controller receives the serialized data and controls a display device to display the image. For example, the controller reconstructs the data packet from the serialized data. In an example, the controller controls the display device based on the data packet to display the image. In another example, the controller decompresses the data packet, such as based on the palette and index values, control word, and the like, to reconstruct the image for display.

In at least some examples, compressing the image prior to transmission reduces an amount of data to be transmitted. Reducing the amount of data to be transmitted reduces a bandwidth and/or amount of time consumed in performing the transmission. By reducing the bandwidth and/or amount of time consumed in performing the transmission, transmitter and receiver circuitry may be active for less time (and therefore in an idle or sleep mode for a greater amount of time), thereby reducing their power consumption. Thus, compressing the image prior to transmission reduces power consumed in performing the transmission.

Figure 7:
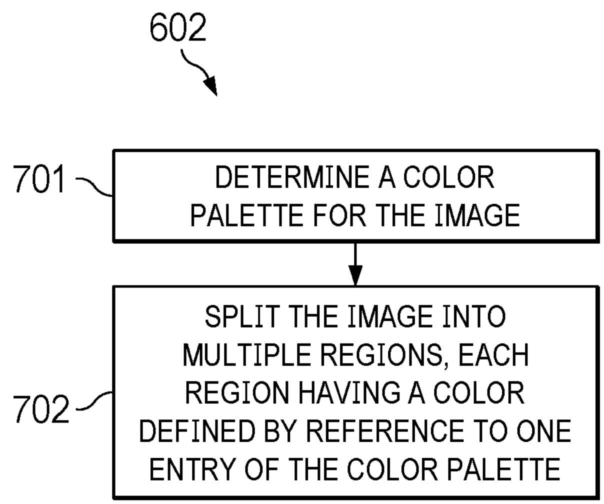
FIG. 7 is a is a flow diagram of a method of compressing an image, in accordance with various examples.

FIG. 7 is a flow diagram of a method 700 of compressing an image, in accordance with various examples. In some examples, the method 700 may be implemented as the operation 602 of the method 600 of FIG. 6.

At operation 702, a color palette is determined for an image. The color palette may be determined according to any suitable process, the scope of which is not limited herein. The color palette may include entries or representations of every color appearing in the image, or entries for groupings of color that are within a threshold difference or variation of one another.

At operation 704, the image is split or partitioned into multiple regions. In some examples, each region includes a single color or multiple colors having less than a threshold variation or difference. Each region may have a color defined by reference to one entry of the color palette. The partitioning of the image may be performed according to any suitable process, the scope of which is not limited herein. In some examples, the image is partitioned according to cluster compression techniques.

Figure 8:
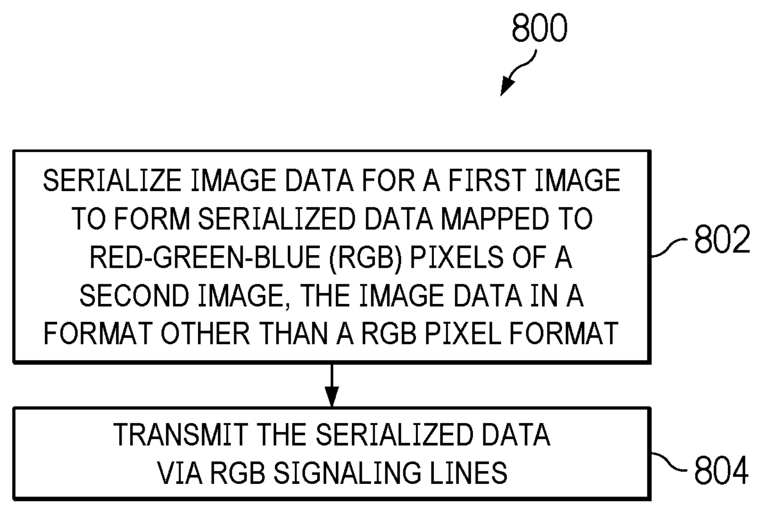
FIG. 8 is a flow diagram of a method of data transmission, in accordance with various examples.

FIG. 8 is a flow diagram of a method 800 of data transmission, in accordance with various examples. In some examples, the method 800 is implemented to serialize data into an RGB pixel format via RGB pixels. The data may be image data not in an RGB pixel format, compressed image data not in an RGB pixel format, or non-image data. In some examples, the method 800 is implemented at least in part by the processor 102, such as to transmit the RGB pixels to the controller 104 via RGB signaling lines. In some examples, the method 800 is implemented as computer-executable instructions stored on a non-transitory computer readable medium. The computer-executable instructions are executable by a processor or processing circuit, such as the processor 102, to cause the processor to be configured to carry out the operations of the method 800.

At operation 802, a processor serializes image data for a first image to form serialized data mapped to red-green-blue (RGB) pixels of a second image, the image data in a format other than a RGB pixel format. The image data for the first image may be in any suitable form. For example, the image data of the first image may be compressed data, as described above herein, representing the first image as a color palette and index values. Although not shown in FIG. 8, in an example, the method 600 includes determining a color palette for the first image and splitting the first image into multiple regions, each region having a color defined by reference to one entry of the color palette. In such an example, the image data of the first image includes the color palette and the references of each of the multiple regions to the color palette, as well as possibly other data, such as a control word or control data for reconstructing the first image from the image data for the first image. In other examples, the image data of the first image includes bitplane data for presenting the first image. In other examples, the image data of the first image is compressed or uncompressed data in any format suitable for representing an image to a display controller.

At operation 804, the processor transmits the serialized data via RGB signaling lines. In some examples, the processor transmits the serialized data to a controller, such as for storage by the controller or to cause the controller to display the image via a display device. In an example, the processor transmits the serialized data by sequentially transmitting RGB pixels of the second image (e.g., portions of the serialized data) via the RGB signaling lines. The sequential transmission continues until the processor has transmitted all data of the serialized data.

Although not shown in FIG. 8, in some examples the controller receives the serialized data and controls a display device to display the first image. For example, the controller reconstructs the data packet from the serialized data. In an example, the controller controls the display device based on the data packet to display the first image. In another example, the controller decompresses the data packet, such as based on the palette and index values, control word, and the like, to reconstruct the first image for display.

In at least some examples, compressing the image data for the first image prior to transmission reduces an amount of data to be transmitted. Reducing the amount of data to be transmitted reduces a bandwidth and/or amount of time consumed in performing the transmission. By reducing the bandwidth and/or amount of time consumed in performing the transmission, transmitter and receiver circuitry may be active for less time (and therefore in an idle or sleep mode for a greater amount of time), thereby reducing their power consumption. Thus, compressing the image data for the first image prior to transmission reduces power consumed in performing the transmission.

In this description, the term "couple" may cover connections, communications, or signal paths that enable a functional relationship consistent with this description. For example, if device A generates a signal to control device B to perform an action: (a) in a first example, device A is coupled to device B by direct connection; or (b) in a second example, device A is coupled to device B through intervening component C if intervening component C does not alter the functional relationship between device A and device B, such that device B is controlled by device A via the control signal generated by device A.

A device that is "configured to" perform a task or function may be configured (e.g., programmed and/or hardwired) at a time of manufacturing by a manufacturer to perform the function and/or may be configurable (or reconfigurable) by a user after manufacturing to perform the function and/or other additional or alternative functions. The configuring may be through firmware and/or software programming of the device, through a construction and/or layout of hardware components and interconnections of the device, or a combination thereof.

A circuit or device that is described herein as including certain components may instead be coupled to those components to form the described circuitry or device. For example, a structure described as including one or more semiconductor elements (such as transistors), one or more passive elements (such as resistors, capacitors, and/or inductors), and/or one or more sources (such as voltage and/or current sources) may instead include only the semiconductor elements within a single physical device (e.g., a semiconductor die and/or integrated circuit (IC) package) and may be coupled to at least some of the passive elements and/or the sources to form the described structure either at a time of manufacture or after a time of manufacture, for example, by an end-user and/or a third-party.

While certain components may be described herein as being of a particular process technology, these components may be exchanged for components of other process technologies. Circuits described herein are reconfigurable to include the replaced components to provide functionality at least partially similar to functionality available prior to the component replacement. Components shown as resistors, unless otherwise stated, are generally representative of any one or more elements coupled in series and/or parallel to provide an amount of impedance represented by the shown resistor. For example, a resistor or capacitor shown and described herein as a single component may instead be multiple resistors or capacitors, respectively, coupled in parallel between the same nodes. For example, a resistor or capacitor shown and described herein as a single component may instead be multiple resistors or capacitors, respectively, coupled in series between the same two nodes as the single resistor or capacitor.

Uses of the phrase "ground voltage potential" in the foregoing description include a chassis ground, an Earth ground, a floating ground, a virtual ground, a digital ground, a common ground, and/or any other form of ground connection applicable to, or suitable for, the teachings of this description. In this description, unless otherwise stated, "about," "approximately" or "substantially" preceding a parameter means being within +/−10 percent of that parameter. Modifications are possible in the described examples, and other examples are possible within the scope of the claims.

What is claimed is:

1. An apparatus, comprising:
compression circuitry configurable to:
compress a first image according to clustering techniques to provide a palette for a block of pixels of the first image and index values mapping pixels of the first image to the palette;
serialize the palette and the index values to form first serialized data, second serialized data, and third serialized data mapped to red-green-blue (RGB) pixels of a second image; and
transmitter circuitry coupled to the compression circuitry and configurable to transmit the first serialized data via a red signaling line, the second serialized data via a green signaling line, and the third serialized data via a blue signaling line.

2. The apparatus of claim 1, wherein the first image is compressed using a cluster compression processor (CCP).

3. The apparatus of claim 2, wherein compressing the first image includes:
determining a color palette for the first image; and
splitting the first image into multiple regions, each region having a color defined by reference to one entry of the color palette.

4. The apparatus of claim 1, wherein to transmit the serialized data, the compression circuitry is configurable to transmit sequential portions of the first, second, and third serialized data as pixels via the red signaling line, the green signaling line, and the blue signaling line across multiple clock cycles until all data of the serialized data has been transmitted.

5. The apparatus of claim 1, wherein the first, second, and third serialized data includes control data for reconstructing the first image from the serialized data mapped to the RGB pixels of the second image.

6. The apparatus of claim 1, wherein the first image and the second image are visually different.

7. A method, comprising:

serializing, via a processor, image data for a first image to form first serialized data, second serialized data, and third serialized data mapped to red-green-blue (RGB) pixels of a second image; and transmitting, by the processor, the first serialized data via a red signaling line, the second serialized data via a green signaling line, and the third serialized data via a blue signaling line, the first serialized data, the second serialized data, and the third serialized data each including information for multiple colors.

8. The method of claim 7, wherein the image data is compressed image data.

9. The method of claim 8, wherein the compressed image data is compressed in a palette compression format formed by:

determining a color palette for the first image; and splitting the first image into multiple regions, each region having a color defined by reference to one entry of the color palette, wherein the compressed image data includes the color palette and the reference of each of the multiple regions to the color palette.

10. The method of claim 7, wherein the image data is bitplane data.

11. A system, comprising:

a controller;

a red signaling line;

a green signaling line;

a blue signaling line;

a display device coupled to the controller; and a processor coupled to the controller via the red signaling line, the green signaling line, and the blue signaling line, wherein the processor is configurable to:

serialize image data for a first image to form first serialized data, second serialized data, and third serialized data mapped to RGB pixels of a second image; and transmit, to the controller, the first serialized data via the red signaling line, the second serialized data via the green signaling line, and the third serialized data via the blue signaling line, the first serialized data, the second serialized data, and the third serialized data each including information for multiple colors.

12. The system of claim 11, wherein the processor is configurable to compress the first image to form the image data of the first image.

13. The system of claim 12, wherein to compress the first image, the processor is configurable to:

determine a color palette for the first image; and split the first image into multiple regions, each region having a color defined by reference to one entry of the color palette, wherein the image data of the first image includes the color palette and the references of each of the multiple regions to the color palette.

14. The system of claim 11, wherein the image data of the first image is bitplane data.

15. The system of claim 14, wherein the controller is a video display controller configurable to deserialize the serialized data to reconstruct the image data for the first image.

16. The system of claim 15, wherein the controller is configurable to decompress the image data for the first image to reconstruct the first image.

17. The system of claim 14, wherein the controller is configurable to control the display device to display the first image based on the bitplane data received via the red signaling line, the green signaling line, and the blue signaling line.

18. The system of claim 11, wherein the display device is an augmented reality display, and the controller is configurable to control the augmented reality display to display the first image based on the image data of the first image received via the red signaling line, the green signaling line, and the blue signaling line.

19. The system of claim 11, wherein the first image and the image data of the first image are visually different as viewed as RGB pixels.

20. The system of claim 11, wherein the display device is a spatial light modulator (SLM).

* * * * *